US012749273B2

(12) United States Patent
Kwon et al.

(10) Patent No.: US 12,749,273 B2
(45) Date of Patent: Sep. 29, 2026

(54) VIRTUAL REALITY TRAINING SYSTEM AND FLOOR UNIT THEREFOR

(71) Applicant: INTERACT Co., Ltd., Incheon (KR)

(72) Inventors: Nam-Hyeok Kwon, Incheon (KR); Jung Hyuk Seo, Gyeonggi-do (KR); So Young Choi, Gyeonggi-do (KR); Sang Jeong, Seoul (KR)

(73) Assignee: INTERACT Co., Ltd., Incheon (KR)

( * ) Notice: Subject to any disclaimer, the term of this patent is extended or adjusted under 35 U.S.C. 154(b) by 1160 days.

(21) Appl. No.: 17/522,117

(22) Filed: Nov. 9, 2021

(65) Prior Publication Data

US 2022/0415001 A1 Dec. 29, 2022

(30) Foreign Application Priority Data

Jun. 25, 2021 (KR) ........................ 10-2021-0083300

(51) Int. Cl.

| | |
|---|---|
| ***G06T 19/20*** | (2011.01) |
| ***G06T 19/00*** | (2011.01) |
| ***G09B 9/00*** | (2006.01) |
| ***H05B 45/20*** | (2020.01) |

(52) U.S. Cl.

CPC ............ *G06T 19/20* (2013.01); *G06T 19/006* (2013.01); *G09B 9/003* (2013.01); *H05B 45/20* (2020.01); *G06T 2219/2004* (2013.01)

(58) Field of Classification Search

CPC ........................................................ G01V 8/12

See application file for complete search history.

(56) References Cited

U.S. PATENT DOCUMENTS

| | | | | |
|---|---|---|---|---|
| 2,929,445 | A * | 3/1960 | Haws | E06B 3/481 160/40 |
| 6,547,670 | B1 * | 4/2003 | Kempf | A63J 1/02 472/78 |
| 9,685,025 | B2 * | 6/2017 | Sternowski | G01V 8/12 |
| 10,255,729 | B1 * | 4/2019 | Pulitzer | G06F 3/016 |
| 10,923,000 | B2 * | 2/2021 | Di Donato | E04H 1/1205 |
| 11,960,797 | B2 * | 4/2024 | Wang | G16H 50/30 |
| 2003/0218537 | A1 * | 11/2003 | Hoch | G06F 3/011 434/323 |

(Continued)

OTHER PUBLICATIONS

Low, et al., "Life-sized projector-based dioramas," VRST '01: Proceedings of the ACM symposium on Virtual reality software and technology, pp. 93-101. (Year: 2001).*

(Continued)

*Primary Examiner* — Ryan F Pitaro
*Assistant Examiner* — Joseph P Morris
(74) *Attorney, Agent, or Firm* — The PL Law Group, PLLC

(57) ABSTRACT

A virtual reality training system according to an aspect of the invention may include a floor system having a base of a particular length and width, an object member configured to be detachably installed on the floor system, an input unit configured to assign a first position, which corresponds to the position of an object within a virtual reality space having a length and width smaller than or equal to the length and width of the base of the floor system, and a mapping unit configured to compute and output a second position, for installing the object member on the floor system, computed as a position on the floor system corresponding to the first position within the virtual reality space.

13 Claims, 7 Drawing Sheets

(56) References Cited

U.S. PATENT DOCUMENTS

| | | | | |
|---|---|---|---|---|
| 2014/0054459 | A1* | 2/2014 | Scott | G07F 19/2055 250/206 |
| 2018/0104614 | A1* | 4/2018 | Gutierrez | G06T 19/006 |
| 2021/0116990 | A1* | 4/2021 | Song | A63F 13/211 |

OTHER PUBLICATIONS

Cheng, et al., "TurkDeck: Physical Virtual Reality Based on People," UIST '15: Proceedings of the 28th Annual ACM Symposium on User Interface Software & Technology, pp. 417-426. (Year: 2015).*

* cited by examiner

VIRTUAL REALITY TRAINING SYSTEM AND FLOOR UNIT THEREFOR

CROSS-REFERENCE TO RELATED APPLICATIONS

This application claims the benefit of Korean Patent Application No. 10-2021-0083300, filed with the Korean Intellectual Property Office on Jun. 25, 2021, the disclosure of which is incorporated herein by reference in its entirety.

BACKGROUND

1. Technical Field

The present invention relates to a virtual reality training system, more particularly to a virtual reality training system and a floor unit for the virtual reality training system that can increase the realism of a virtual reality training session and thus improve the effectiveness of a virtual reality training session by more closely simulating training in an actual environment.

2. Description of the Related Art

Virtual reality (VR) refers to a technology that simulates a virtual environment by using a headset to provide images to the user's left and right eyes as well as sound effects associated with the images, so that the user can experience the virtual environment through the perceived visual and auditory stimuli. Virtual reality has become widely popularized and is being used for various entertainment and training purposes.

Virtual reality is based mainly on providing the user with visual and auditory stimuli and is limited in providing stimuli perceived by other senses. While olfactory and gustatory may seldom be required in the context of training and entertainment, needs for tactile stimuli may occur relatively more frequently. For example, when an object or a structure is simulated visually in a virtual reality space, it may occur that the user attempts to grab an object or lean on a structure, and since the object or structure is not present in the actual environment, the user may experience confusion or even injury such as by falling.

In particular, in a training session using virtual reality, interactions with the surrounding structures can be a major part of the training. For example, a counter-terrorist training session may require the trainee to lean behind structures such as walls, etc., where such use of the structures as a means of concealment or defense can correspond to a large part of the training. In such situations, a virtual reality space provided only by way of visual and auditory stimuli would not allow the trainee to interact with the structures, and the effectiveness of the training would be diminished.

SUMMARY

An aspect of the present invention, which was conceived to resolve the problem described above, is to provide a virtual reality training system, and a floor unit for the virtual reality training system, which can determine the corresponding position of an object in an actual space when the object is placed within a virtual reality space and allow an implementation of an actual space having a similar arrangement of structures as that of the virtual reality space.

Other objectives of the invention will be more clearly understood from the embodiments set forth below.

A virtual reality training system according to one aspect of the invention can include: a floor system having a base of a particular length and width; an object member configured to be detachably installed on the floor system; an input unit configured to assign a first position, which corresponds to the position of an object within a virtual reality space having a length and width smaller than or equal to the length and width of the base of the floor system; and a mapping unit configured to compute and output a second position, for installing the object member on the floor system, computed as a position on the floor system corresponding to the first position within the virtual reality space.

A virtual reality training system according to an embodiment of the invention can include one or more of the following features. For example, the virtual reality training system can further include a lighting unit that irradiates visible rays towards the second position or irradiates visible rays from the second position. In one example, the lighting unit can include a lighting element that is installed at a particular height from the base and is configured to irradiate visible rays towards the second position. At least one lighting element can be movably mounted on a structure installed at a particular height from the base and can irradiate the visible rays after moving to a position from which the irradiating of the visible rays towards the second position is possible.

The floor system can further include a multiple number of slots formed in the base, the lighting unit can include lighting elements mounted within the multiple slots, and the lighting unit can irradiate the visible rays from the lighting element corresponding to the second position.

The object members can include a multiple number of types, which may differ from one another in at least one of size, shape, texture, and scent; the input unit can assign the type of the object together with the first position, the mapping unit can compute the type of the object member together with the second position, and the lighting unit can alter the color of the visible rays depending on the type of the object member.

The floor system further can include a multiple number of protrusion parts, which may be configured to be movable along a vertical direction within a range defined between a height below an upper surface of the base and a particular height above the upper surface of the base, or a multiple number of cavity parts, which may be formed in the upper surface of the base and configured to be opened and closed. Here, the object member can include a holding part configured to receive the protrusion part inserted therein or a pile part configured to be inserted into the cavity part, and the floor system can move the protrusion part upward or open the cavity part at the second position according to a received control signal.

The floor system can include a multiple number of slots formed in the base, and the object member can include a securing part configured to be inserted into the slot such that the object member installed on the floor system is capable of movement along the slot. Here, the floor system can further include sensors provided within the multiple slots, respectively, where each sensor can be configured to detect whether or not the object member is installed in the corresponding slot. Also, the object member can include a tag part, and the sensor can identify at least one of the type, size, ID number, and assigned position of the object member from the tag part.

The floor system can further include a drive unit that is provided within the slot and configured to move the object member along the slot. A virtual reality training system according to an embodiment of the invention can further include a loading device that is arranged adjacent to an edge of the floor system, where the multiple slots can be open through the side surface at the edge of the floor system, and the loading device can be configured to insert the securing part of the object member through an open side of a slot corresponding to the second position from among the multiple number of slots. The object member can include a coupling part on the edge portion at either side such that the coupling parts may at least partially bridge the gap between adjacent object members.

The input unit cam provides a UI expressing the virtual reality space 2-dimensionally or 3-dimensionally and can assign the first position according to an input by the user. The UI can be provided via a VR headset worn by the user.

Another aspect of the invention can provide a floor unit for the floor system of a virtual reality training system. The floor unit can include: a body, which extends in one direction in a length corresponding to a grid unit of the floor system, and in which a slot is formed that is open at the upper surface and at both ends of the body; and a lighting element installed within the slot, where an upper portion of the slot can have a narrower width than a lower portion of the slot.

The floor unit can further include a roller that is rotatably installed within the slot and is configured to support an object member inserted in the slot. The floor unit can further include a drive unit that is provided within the slot and is configured to move the object member inserted in the slot. The floor unit can further include a sensor configured to detect an object member inserted in the slot. Here, the sensor can be configured to detect rays irradiated by the lighting element, the object member can block the rays of the lighting element from arriving at the sensor when the object member is inserted in the slot, and the sensor can detect the presence of the object member based on a reduction in the amount of detected rays.

An embodiment of the present invention having the features above can provide various advantageous effects including the following. However, an embodiment of the present invention may not necessarily exhibit all of the effects below.

When a user places one or more objects within a virtual reality space, an embodiment of the invention can show the corresponding positions on the floor system, thereby specifying the positions where the object members should be installed. This can simulate an environment in which the trainee is able to interact with the objects within the virtual reality space during a virtual training session, so that the effectiveness of the training may be greatly increased.

Also, when various types of objects are placed in a complicated configuration within a space for virtual reality training, an embodiment of the invention can implement an automatic replication of the configuration in an actual space.

An embodiment of the invention allows for a high degree of freedom in organizing a space for virtual reality training, thereby providing significant improvements in the effectiveness and possible scope of training sessions.

DETAILED DESCRIPTION

Figure 1:
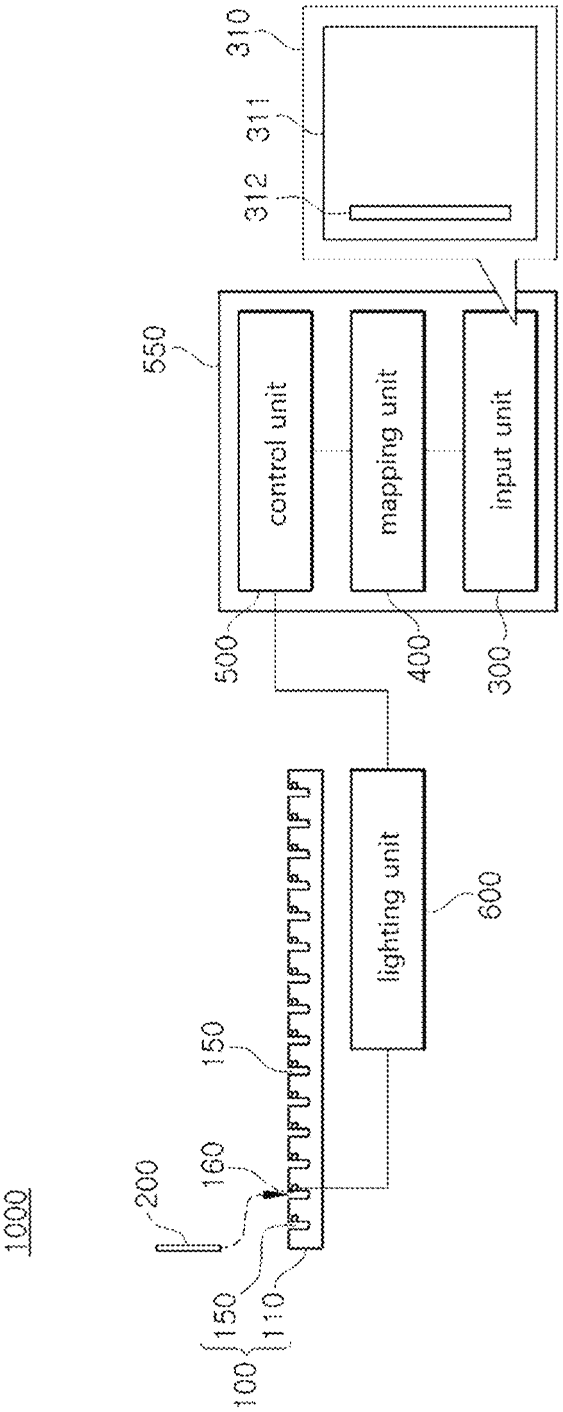
FIG. 1 is a diagram conceptually illustrating a virtual reality training system according to a first disclosed embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

FIG. 1 is a diagram conceptually illustrating a virtual reality training system 1000 according to a first disclosed embodiment of the invention. Referring to FIG. 1, virtual reality training system 1000 according to the first disclosed embodiment of the invention can include a floor system 100, object members 200, an input unit 300, a mapping unit 400, a control unit 500, and a lighting unit 600.

A virtual reality training system 1000 according to the first disclosed embodiment of the invention may be a system for organizing a space in which to provide a virtual reality experience or training session. In the present specification, the term “user” mainly refers to a person who installs or assigns positions for the object members 200 to organize the training space, whereas the term “trainee” refers to a person who receives the virtual reality experience or training session in the organized training space. Of course, a “user” can also be a “trainee”, and a “trainee” can also be a “user”.

The floor system 100 can include a base 110 having a particular length and width and a multiple number of slots 150 formed in the base 110. The floor system 100 can be located within the space where virtual reality training sessions are to be performed and can form the floor surface in the space where the trainee receives training. More specifically, the trainee can undergo training over the floor system 100 while wearing a VR headset, etc., that provides visual and auditory stimuli for virtual reality. The base 110 can form the floor surface of the space where the training is performed, and the slots 150 can be formed in the upper surface of the base 110 to a particular depth and configured to allow coupling with a portion of an object member 200. The floor system 100 can also be provided with detector devices (not shown) such as markers, sensors, etc., that allow the VR headset of the trainee to recognize the relative position of the VR headset with respect to the floor system 100.

The object members 200 can be detachably installed onto the floor system 100. An object member 200 can be a member that extends in a vertical direction relative to the base 110 up to a particular height and can be used to simulate a structure such as a wall, etc. That is, if a structure such as a wall, etc., with which interaction by a trainee is desired, is present in the virtual reality space 311, the user can install an object member 200 at the corresponding position of the floor system 100. As a result, an object member 200 can actually be placed at a position where the trainee visually perceives a structure to be present within the virtual reality space 311, and the effectiveness of the virtual reality training received by the trainee can be greatly increased.

The input unit 300 can assign the positions of objects 312 within the virtual reality space 311. For example, the input unit 300 can provide the user with a UI (user interface) 310 that expresses the virtual reality space 311 either 2-dimensionally or 3-dimensionally, and the user can arrange one or more objects 312 at specific positions within the virtual reality space 311 by way of the UI 310. An object 312 can be a virtual reality object that extends vertically to a particular height from the floor surface within the virtual reality space 311.

The UI 310 provided to the user by the input unit 300 can be a UI provided, for example, through the display of a computing device. The UI 310 can represent the virtual reality space 311 in the form of a plan diagram, a parallel projection, etc. In certain embodiments, the input unit 300 can include a VR headset (not shown) and a sensor for recognizing the motions of the user, so that the input by the user may itself be made within the virtual reality space 311.

Of course, the placement of objects 312 by the input unit 300 does not necessarily have to require user input, and it is possible for the input unit 300 to place objects 312 according to one of multiple patterns stored beforehand or generate a pattern for placing objects 312 according to a predetermined set of rules.

If the positions where object members 200 can be installed on the floor system 100 are limited to a particular pattern such as a grid, etc., as described below, then the first positions that can be assigned by the input unit 300 may also be limited to a corresponding pattern.

The mapping unit 400 can compute the positions where the object members 200 should be installed on the floor system 100 from the positions of the objects 312 assigned by the input unit 300. For convenience, the position of an object placed in the virtual reality space 311 is referred to herein as a first position, and the position where an object member 200 should be installed correspondingly is referred to herein as a second position.

When a multiple number of objects 312 are placed within the virtual reality space 311, the input unit 300 can transfer the values of the multiple first positions to the mapping unit 400, after which the mapping unit 400 can compute the values of the multiple second positions accordingly. The mapping unit 400 can output the computed second positions and transmit the values to the control unit 500. Of course, in an embodiment that does not include a separate control unit 500, the computed second positions can also be transmitted to the lighting unit 600, floor system 100, or another device.

The control unit 500 can generate and transmit control signals associated with the organizing of the space for virtual reality training based on the second positions computed at the mapping unit 400. For example, in the first disclosed embodiment of the invention illustrated in FIG. 1, the control unit 500 can transmit control signals to the lighting unit 600, and the lighting unit 600 can irradiate visible rays from lighting elements corresponding to the second positions.

Of course, it is not necessary that the input unit 300, mapping unit 400, and control unit be implemented as separate components, and one or more of these units can be implemented in an integrated form within a single computing device 550.

The lighting unit 600 can include one or more lighting elements 160 and can turn on lighting elements 160 corresponding to the second positions based on control signals received from the control unit 500 or information related to the second positions received from the mapping unit 400. While the lighting elements 160 corresponding to the second positions are operational and irradiating visible rays, the object members 200 can be manually or automatically installed onto the floor system 100.

In cases where the object members 200 are installed manually, the user can easily identify the positions where the object members 200 should be installed on the floor system 100 from the lighting of the lighting elements 160. In cases where the object members 200 are installed automatically, the object members 200 can be installed after the user checks the operational lighting elements 160 and confirms that the placement of object members 200 is adequate, or the object members 200 can be installed automatically without requiring confirmation by the user.

Figure 2:
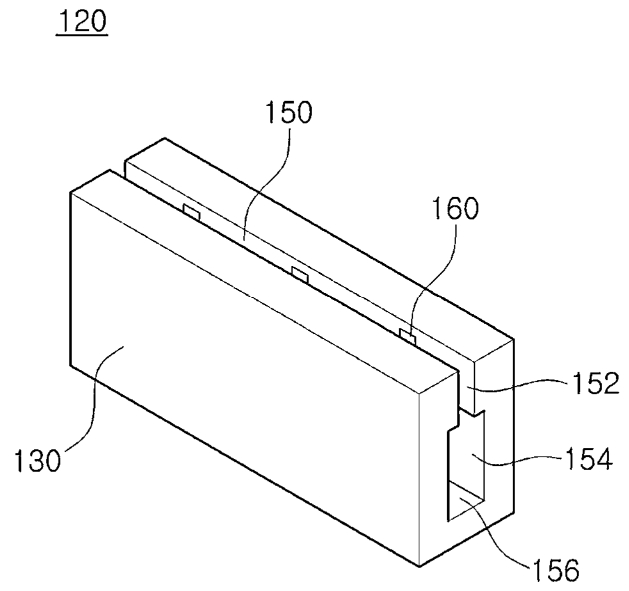
FIG. 2 is a perspective view of a floor unit according to the first disclosed embodiment of the invention.
Figure 3:
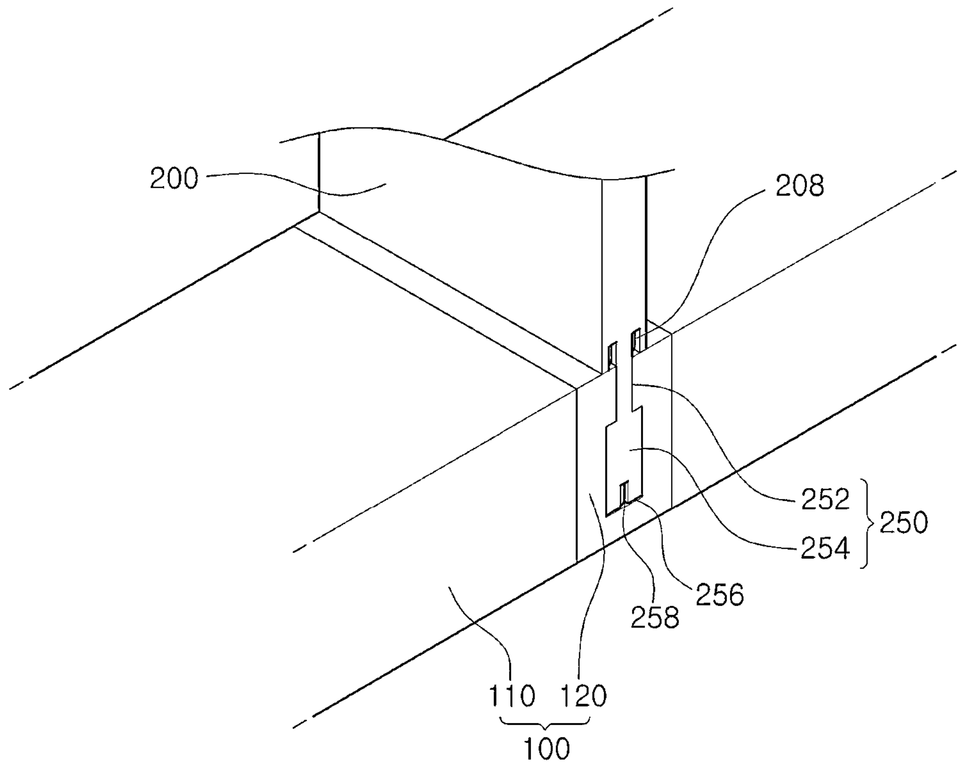
FIG. 3 is a perspective view of a floor unit and an object member coupled together according to the first disclosed embodiment of the invention.

FIG. 2 is a perspective view of a floor unit 120 according to the first disclosed embodiment of the invention, and FIG. 3 is a perspective view of a floor unit 120 and an object member 200 coupled together according to the first disclosed embodiment of the invention.

Referring to FIG. 2 and FIG. 3, in a virtual reality training system 1000 according to the first disclosed embodiment of the invention, the floor system 100 can include a base 110 and a floor unit 120. Each floor unit 120 can include a slot 150, and a multiple number of floor units 120 can be installed in grooves formed in a single base 110 or can be coupled in-between a multiple number of individual bases 110.

The floor system 100 can for example take the form of a grid (see FIG. 4), where each floor unit 120 can correspond to a side of a square within the grid. That is, the multiple floor units 120 can be arranged such that the slots 150 extend in orthogonal directions to form a grid. In such cases, the second positions specified by the mapping unit 400 can each correspond to a single floor unit 120. In the middle of four floor units 120, a cross-shaped slot can be provided that connects the slots 150 along the two directions, where the cross-shaped slot can be formed in the base 110 or in a separate connection member (not shown).

A floor unit 120 according to the first disclosed embodiment of the invention can include a body 130 having a slot 150 formed within. The body 130 can extend in a length corresponding to one side of a square in the grid of the floor system 100, as described above. The slot 150 can be open at the upper surface of body 130, so as to allow the installation of an object member 200, and at both ends, so that the slots 150 of multiple floor units 120 may be interconnected.

The object member 200 can be formed such that its upper portion extends to a particular height above the floor unit 120, while its lower portion can include a securing part 250 that is configured to be inserted into a slot 150. The object member 200 can be installed on the floor system 100 as the securing part 250 is inserted into the slot 150. In cases where multiple slots 150 are interconnected, the connected slots 150 can extend up to the side surface at an edge of the floor system 100, and installing an object member 200 on a floor unit 120 located on the inside can entail inserting the securing part 250 of the object member 200 into the slot 150 open at the side surface of the edge of the floor system 100.

The slot 150 of a floor unit 120 can be formed such that the upper portion 152 is narrower than the lower portion 154, and correspondingly, the securing part 250 of the object member 200 can be formed such that the thickness of the upper portion 252 is smaller than the thickness of the lower portion 254. In such cases, the object member 200 can be inserted into the open end of the slot 150 by sliding along the extending direction of the slot 150. Since the thickness of the lower portion 254 of the securing part 250 is greater than the width of the upper portion 152 of the slot 150 as illustrated in FIG. 3, the object member 200 may be prevented from becoming detached from the slot 150 in the vertical direction.

According to an embodiment of the invention, the wheels 208, 258 can be formed on the object member 200 to reduce friction between the object member 200 and the slot 150. In the example illustrated in FIG. 3, the object member 200 includes wheels 208 formed at the portions contacting the upper surface of the floor unit 120 and wheels 258 formed in the lower surface 256 of the securing part 250.

In an embodiment not shown in the drawings, a surplus space can be provided at the lower portion 154 of the slot 150, and a lever, etc., for adjusting the extent to which the wheels 208, 258 of the object member 200 protrude downward (i.e., for moving the portions other than the wheels 208, 258 upward) can be provided on the object member 200. For example, a lever can be provided that causes only the wheels 208, 258 to contact the floor unit 120 when pulled down and causes the entire lower surface 256 of the securing part 250 to contact the bottom surface 158 of the slot 150 when pushed up, so that the user may adjust the friction between the object member 200 and the floor unit 120 as necessary.

Of course, besides the method of using wheels 208, 258, various other methods can be used for reducing or adjusting the friction between the object member 200 and the slot 150. Examples of such methods would include applying any of a variety of locking devices for securing the object member 200 after the object member 200 is installed at a desired position.

Although it is not illustrated in detail, coupling parts for coupling adjacent object members 200 can be formed on portions of the object member 200 other than the securing part 250, i.e., on portions of the object member 200 extending above the floor system 100. In cases where the floor units 120 are arranged in transverse and longitudinal directions along a grid pattern, floor units 120 that are adjacent along a lengthwise direction would have a gap corresponding to the width of the floor unit 120 (i.e., where the cross-shaped slot mentioned above may be provided). Therefore, if each object member 200 is formed in a length corresponding to the length of the floor unit 120, there may be a gap also between adjacent object members 200.

The coupling parts formed on both ends of the object member 200 can be implemented for example in a form that extends and connects to an object member 200, allowing the adjacent object members 200 to provide structural support to each other. In another example, the coupling parts can be implemented in a form that is normally folded onto the end portion but unfolded towards the adjacent object member 200 when needed. While such type of coupling part may not provide structural support between object members 200, it may fill in the gap between the adjacent object members 200 to provide an uninterrupted plane. In yet another example, the coupling part can be implemented with a triangularly shaped cross section that extends up to a half of the gap between object members 200. With this type, it would be possible to install four object members 200 around a single point without having the object members 200 obstruct one another.

Of course, if the gaps between object members 200 are very small compared to the length of each object member 200, the virtual reality training may remain largely unaffected even if the gaps between the object members 200 are left unfilled.

A floor unit 120 can include one or multiple lighting elements 160, which can be operated based on a control signal received from the control unit 500 or based on information related to the second position received from the mapping unit 400. Depending on different points of view, the lighting element 160 can be regarded as a part of the lighting unit 600, the floor system 100, or the floor unit 120.

The lighting element 160 can be provided on the upper surface of a floor unit 120 or within the slot 150. In cases where the lighting element 160 is placed within the slot 150, the visible rays irradiated by the lighting element 160 can be reflected off the inner surfaces of the slot 150, creating an effect similar to irradiating the visible rays from the entire slot 150. By placing the lighting element 160 at the upper portion 152 of the slot 150, it would be possible to increase the proportion by which the visible rays irradiated from the lighting element 160 is emitted to the outside of the slot 150.

When the second positions are computed according to the first positions assigned at the input unit 300, the lighting elements 160 corresponding to the second positions, i.e., the lighting elements 160 of the floor units 120 corresponding to the second positions, can be operated to irradiate visible rays, and the object members 200 can be manually or automatically installed on the floor system 100. As illustrated in FIG. 3, if it is determined that a particular floor unit 120 corresponds to a second position where the installing of an object member 200 is required, then the lighting element 160 provided at the floor unit 120 can irradiate visible rays, and the object member 200 can be manually or automatically installed on the floor unit 120.

The object member 200 can be inserted through the open end of the slot 150 as described above, and when an object member 200 is installed on a floor unit 120 where the lighting element 160 is turned on, the object member 200 can obstruct the rays from the lighting element 160 such that the visible rays are not seen from the exterior. In this way, the lighting element 160 can also serve to indicate a position where installing an object member 200 is required but not yet completed. After all of the object members 200 have been installed at their proper positions, the lighting unit 600 can turn off the lighting elements 160 according to a manipulation by the user or a signal from the control unit 500.

Figure 8:
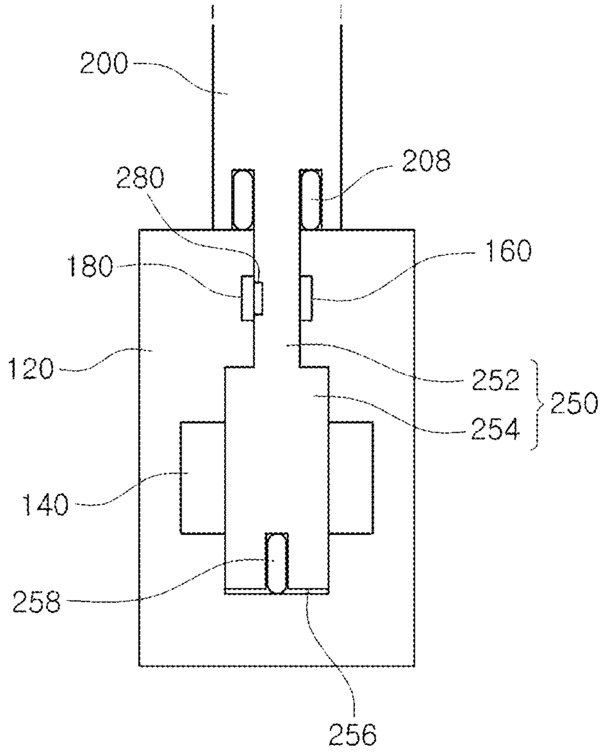
FIG. 8 is a cross-sectional view of a floor unit and an object member coupled together according to the second disclosed embodiment of the invention.

The floor unit 120 can also include a sensor 180 (see FIG. 8). The sensor 180 can be configured to detect whether or not an object member 200 is properly installed in the slot 150 of the corresponding floor unit 120. The sensor 180 can use any of a variety of methods to detect the object member 200. For example, the object member 200 can include a separate tag part 280 (see FIG. 8) on the securing part 250, and the sensor 180 can be made to detect the tag part 280 when the object member 200 is properly positioned. In another example, the sensor 180 can be implemented as a photosensitive sensor facing the lighting element 160, so that when the object member 200 is installed in the slot 150, the securing part 250 may block the visible rays irradiated by the lighting element 160, and the sensor 180 can detect the presence of the object member 200 based on the reduction in the amount of detected rays. When the sensor 180 detects an object member 200, the lighting element 160 of the corresponding floor unit 120 can change the brightness, color, etc., of the irradiated visible rays or can be turned off altogether.

With the first disclosed embodiment of the invention presented above, the user can place one or more objects 312 in a virtual reality space 311, and the virtual reality training system 1000 can show the corresponding positions also on the floor system 100 to specify the positions where object members 200 should be installed. Thus, the virtual reality training system 1000 can simulate an experience that allows the trainee to interact with the objects 312 in the virtual reality space 311 when undergoing a virtual reality training session, thereby greatly increasing the effectiveness of the training.

Figure 4:
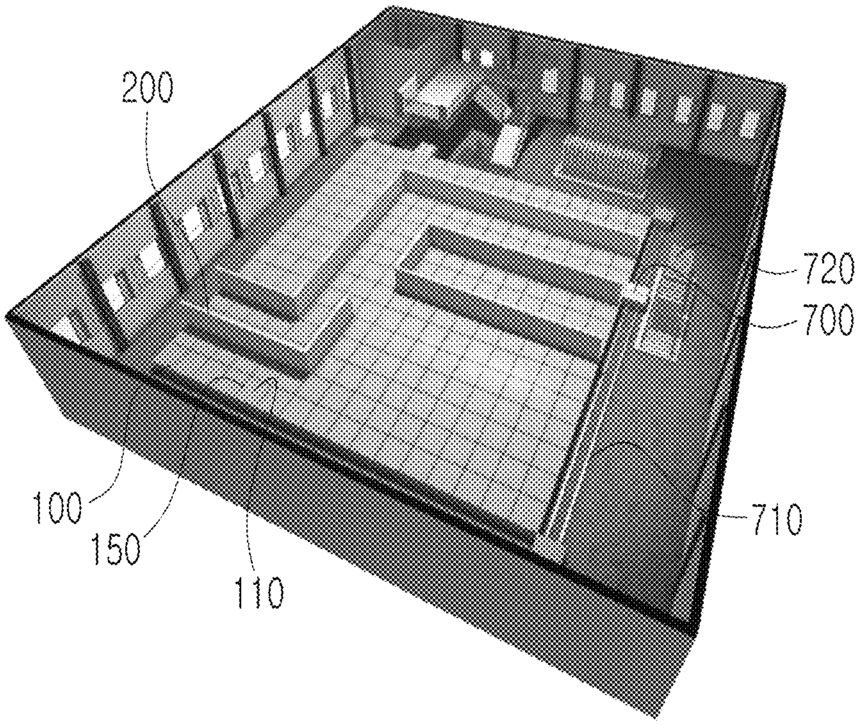
FIG. 4 is a perspective view illustrating object members installed on the floor system in a virtual reality training system according to a second disclosed embodiment of the invention.
Figure 5:
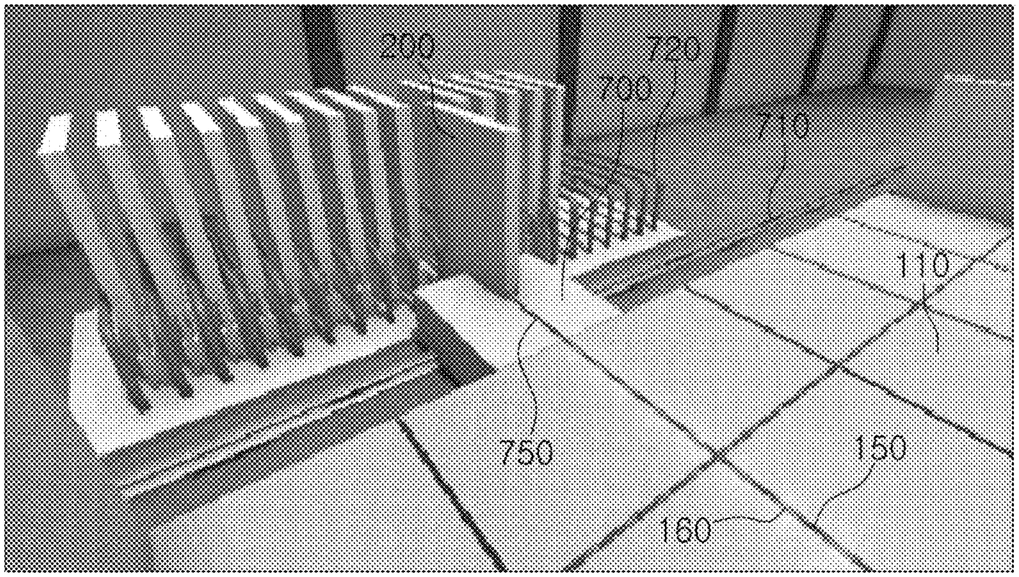
FIG. 5 is a perspective view of the loading device in a virtual reality training system according to the second disclosed embodiment of the invention.
Figure 6:
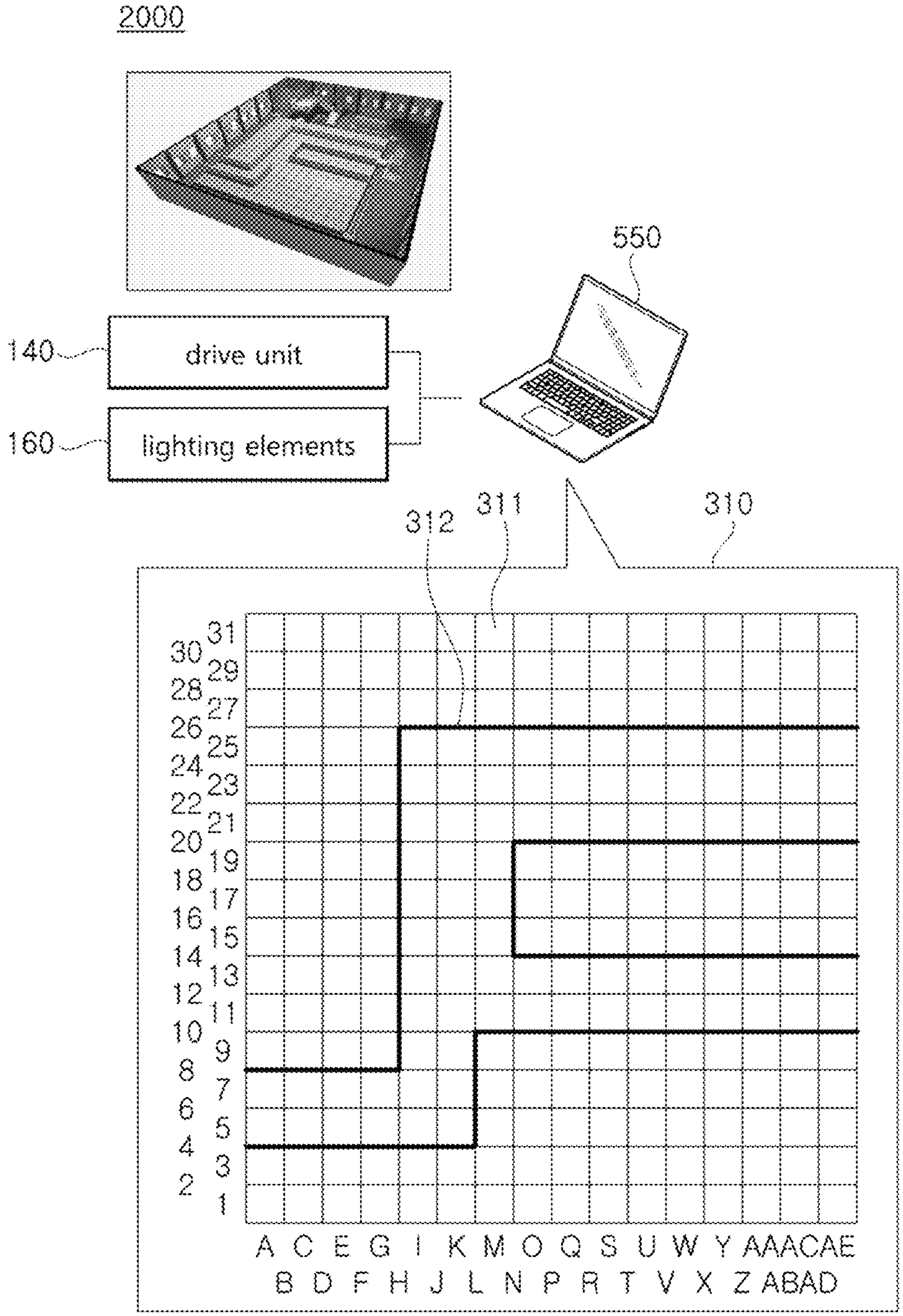
FIG. 6 is a diagram conceptually illustrating a virtual reality training system according to the second disclosed embodiment of the invention.
Figure 7:
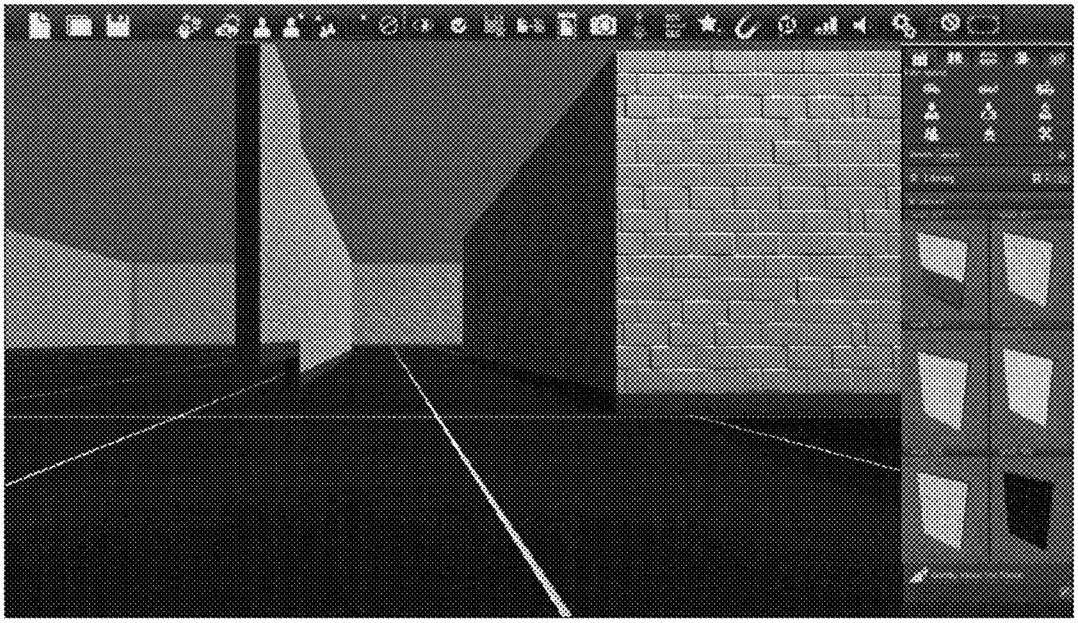
FIG. 7 illustrates a UI provided by the input unit in a virtual reality training system according to the second disclosed embodiment of the invention.

FIG. 4 is a perspective view illustrating object members 200 installed on the floor system 100 in a virtual reality training system 2000 according to a second disclosed embodiment of the invention, and FIG. 5 is a perspective view of the loading device 700 in a virtual reality training system 2000 according to the second disclosed embodiment of the invention. FIG. 6 is a diagram conceptually illustrating a virtual reality training system 2000 according to the second disclosed embodiment of the invention, FIG. 7 illustrates a UI 310 provided by the input unit 300 in a virtual reality training system 2000 according to the second disclosed embodiment of the invention, and FIG. 8 is a cross-sectional view of a floor unit 120 and an object member 200 coupled together according to the second disclosed embodiment of the invention. A virtual reality training system 2000 based on the second disclosed embodiment has many features in common with a virtual reality training system 1000 based on the first disclosed embodiment, and some of these common features may have been omitted in the drawings and descriptions.

Referring to FIGS. 4 to 8, a virtual reality training system 2000 according to the second disclosed embodiment of the invention can include a floor system 100, object members 200, an input unit 300, a mapping unit 400, a control unit 500, and a loading device 700. However, FIG. 6 depicts the input unit 300, mapping unit 400, and control unit 500 as being integrated within a single computing device 550.

A virtual reality training system 2000 based on the second disclosed embodiment of the invention may be similar to a virtual reality training system 1000 based on the first disclosed embodiment of the invention, and when the input unit 300 assigns the first positions and the mapping unit 400 computes their corresponding second positions, the control unit 500 can transmit control signals for turning on the lighting elements 160 corresponding to the second positions and, at the same time, determine the installation order of the multiple object members 200 and move the object members 200 to the second positions automatically.

Referring to FIG. 4, a loading device 700 can be arranged at the edge of the floor system 100. The loading device 700 can be configured to move along guide rails 710 that extend along the edge of the floor system 100 and can be located between the floor system 100 and a storage rack 720. The storage rack 720 can store the object members 200 before they are installed.

The floor units 120 located at the edge of the floor system 100 can have their slots 150 open at the side surface of the edge of the floor system 100, and the loading device 700 can withdraw an object member 200 from the storage rack 720 and insert the object member 200 into the edge slot at a position from which the slot 150 of the second position where the object member 200 should be installed can be reached.

Referring to FIG. 5, a slot 750 can be formed in the loading device 700, where the slot 750 may have the same or a similar shape as the slot 150 of the floor unit 120. A separate structure for inserting an object member 200 stored in the storage rack 720 into the slot 750 of the loading device 700 can be provided on the storage rack 720 or the loading device 700. When the object member 200 is withdrawn onto the loading device 700, the loading device 700 can move along the guide rails 710 to the necessary position of the floor system 100 such that the slot 750 of the loading device 700 aligns with the slot 150 of the floor unit 120 of the corresponding position. Then, the loading device 700 can move the object member 200 into the slot 150 of the floor unit 120, and the drive unit 140 of each floor unit 120 up to the final position where the object member 200 is to arrive (i.e., the second position) can move the object member 200. A more detailed description of the structures of the loading device 700 and floor units 120 will be described later on.

As illustrated in FIG. 4, loading devices 700 can be arranged, respectively, at two or more adjacent edges of the floor system 100. The control unit 500 can determine the installation order of the object members 200, where the object members 200 furthest from the loading devices 700 may generally be installed first, so as not to obstruct the installation of other object members 200. While FIG. 4 illustrates two loading devices 700 that move along linearly placed guide rails 710, it is possible to connect the guide rails 710 and provide just one loading device 700 or to place three or four loading devices 700 at different edges.

Referring to FIG. 6, the user can place objects 312 in the virtual reality space 311 by way of a UI 310 provided by the input unit 300. In cases where the region available for placing object members 200 on the floor system 100 is implemented in a grid form as in the first and second disclosed embodiments of the invention, the region where objects 312 can be placed within the virtual reality space 311 can also be limited to a grid form, using the same type of grid as the grid of the floor system 100.

Any of a variety of methods can be used to assign the positions where objects 312 may be placed within a grid pattern. For example, in FIG. 6, letters and numbers are assigned to the lines and the spaces between lines of the grid. That is, in the example illustrated in FIG. 6, the series of objects placed on the lower left, from among the objects 312 placed in the virtual reality space 311 shown on the UI 310, are installed continuously at positions identified as A4, C4, E4, G4, I4, and K4 to form a single wall. In the floor system 100 shown on the left of FIG. 6, object members 200 have not yet been installed in the second positions corresponding to the first positions assigned as M10 to AE10 in the UI 310, and the lighting elements 160 of the corresponding floor units 120 are therefore turned on.

FIG. 7 illustrates an example of a UI 310 that can be used in an embodiment of the invention. As illustrated, the UI 310 can simulate and display the virtual reality space 311 and the objects 312 placed therein as a 3-dimensional space. The UI 310 can also provide different modes for expressing the virtual reality space 311 as a 3-dimensional space and as a 2-dimensional plane for the user's convenience. The UI 310 can also be provided by way of a VR headset and a motion recognition sensor as described above. As illustrated in FIG. 7, a grid corresponding to grid of the floor system 100 can be shown in the UI 310, and the allowable region for placing objects 312 by the user can also be limited to a corresponding grid.

As shown on the right side of FIG. 7, the objects 312 may not necessarily be limited to a single type, and many types can be utilized. In such cases, the object members 200 simulating the objects 312 can also be provided in multiple types. The object members 200 can be classified into different types with differences for example in size, shape, texture, scent, etc., and the UI 310 of the input unit 300 can provide different types of objects 312 according to the available types of object members 200 and can reflect the properties of the types in displaying the object members 200. In such cases, the input unit 300 can assign the type of object 312 together with the first position of the object 312, and the mapping unit 400 can compute the type of object member 200 together with the second position of the object member 200.

For example, in cases where different types of object members 200 differ in size, the height and/or thickness of the wall, etc., can be different according to type. In cases where different types of object members 200 differ in shape, certain types can simulate walls, etc., while certain types can simulate other objects such as vehicles, vendor stands, etc. In cases where different types of object members 200 differ in texture, the surface roughness, etc., can be different according to type. In cases where different types of object members 200 differ in scent, certain aromatic substances relevant in the context of the virtual reality training can be applied to the surfaces of object members 200.

FIG. 8 is a cross-sectional view illustrating a floor unit 120 and an object member 200 coupled together according to the second disclosed embodiment of the invention. Similar to the first disclosed embodiment of the invention, the floor unit 120 can include a slot 150 of which the lower portion 154 has a greater width than the upper portion 152, and a securing part 250 of which the lower portion 254 has a greater width than the upper portion 252 can be inserted into slot 150. Also, the wheels 208, 258, etc., can be provided on the object member 200 to maintain low friction between the floor unit 120 and the object member 200. Thus, the object member 200 can be secured in the vertical direction but can be freely movable in the horizontal direction along the lengthwise direction of the slot 150.

The floor unit 120 can include a drive unit 140, where the drive unit 140 can serve to move an object member 200. The drive unit 140 can be provided on one side or both sides of the securing part 250 of the object member 200 and can move the object member 200 in the lengthwise direction according to the direction of rotation provided by the operation of a motor (not shown). The drive unit 140 can be implemented for example as a roller, gear, chain, conveyor belt, etc., and the drive unit 140 can be implemented such that the friction between the securing part 250 and the drive unit 140 is greater than the friction between the securing part 250 and the inner surfaces of other portions of the slot 150.

The floor unit 120 can also include a sensor 180, where the sensor 180 can be configured to detect whether or not an object member 200 is properly installed in the slot 150 of the corresponding floor unit 120. As described above, the sensor 180 can be implemented as a photosensitive sensor facing the lighting element 160, and when an object member 200 is installed in the slot 150, the securing part 250 can be made to block the visible rays irradiated by the lighting element 160, so that the sensor 180 can detect whether or not an object member 200 is present based on the reduction in the amount of detected rays.

The object member 200 can include a separate tag part 280 on the securing part 250, and the sensor 180 can detect and receive information from the tag part 280. The tag part 280 can be implemented for example as an RFID tag, and the storage rack 720 or loading device 700 can be configured to record information on the tag part 280 of the object member 200.

In one example, information related to the assigned position (second position) of the corresponding object member 200 can be recorded on the tag part 280. The sensor 180 can read the information of the tag part 280 and compare the information with the position of the corresponding floor unit 120, and the drive unit 140 in a cooperating manner can secure the object member 200 in the corresponding slot 150 or move the object member 200 in a particular direction. Using the grid illustrated in FIG. 6 as an example, if an object member 200 that should be installed at position H25 is loaded into the slot at position H31, the sensor 180 at position H31 can read the information recorded on the tag part 280 revealing that the assigned position is H25, and the control unit 500 can compare this with the current position, H31, and control the drive unit 140 to move the object member 200 further to the inside of the grid. If an object member 200 that should be installed at position H25 was loaded into a slot from which position H25 cannot be reached, for example the slot at position J31, then the control unit 500 can identify the error by way of the sensor 180 and move the object member 200 back into the slot 750 of the loading device 700.

In cases where the object members 200 are divided into multiple types, the tag part 280 of each object member 200 can include information regarding the type of the object member 200 or the distinguishing property of the type, such as size, shape, texture, scent, etc. For example, if an object member 200 of a second type is to be placed in a particular position, where the object members 200 are divided into walls of a first type having a first height and walls of a second type having a second height, then the tag part 280 can include information regarding the second type or the second height, and the loading device 700 can withdraw an object member 200 of the second type when withdrawing an object member 200. If an object member 200 is installed on the floor unit 120 of a particular position but the object member 200 is not of the assigned type, then the sensor 180 can detect the error, and the control unit 500 can take the required countermeasures or inform the user of the error. In cases where the object members 200 are divided into multiple types, a separate storage rack 720 can be provided for each type.

The drive unit 140 and sensor 180 provided in the slot 150 of a floor unit 120 can be provided in the same or a similar manner in the slot 750 of the loading device 700 as well.

With the second disclosed embodiment of the invention presented above, the user can place one or more objects 312 in a virtual reality space 311, and the virtual reality training system 2000 can automatically install the object members 200 on the floor system 100 correspondingly. The object members 200 can be provided in various types, and the user can select a certain type when placing an object 312. Thus, even when the objects 312 are placed in a complicated configuration in the UI 310, the virtual reality training system 2000 can install the object members 200 automatically, and since the trainee can experience virtual reality training with a greater degree of realism, the effectiveness of the training can be greatly increased.

Figure 9:
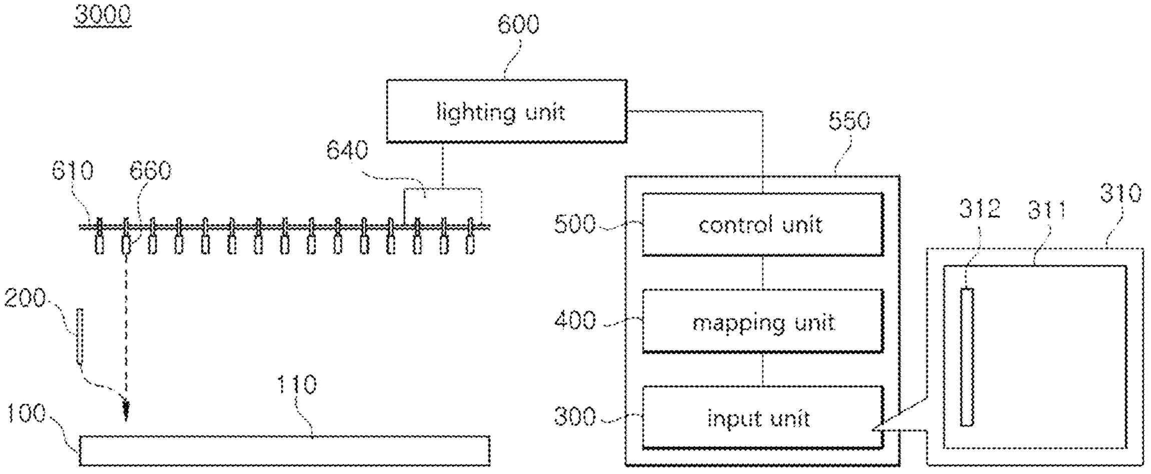
FIG. 9 is a diagram conceptually illustrating a virtual reality training system according to a third disclosed embodiment of the invention.
Figure 10:
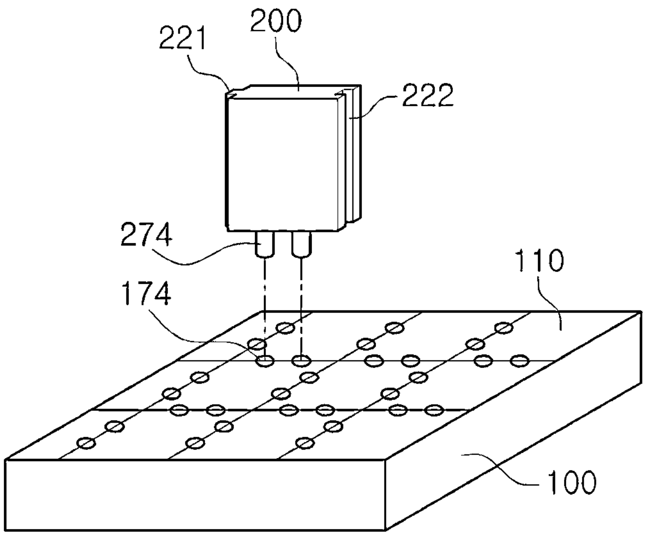
FIG. 10 is a perspective view illustrating a floor system and an object member in a virtual reality training system according to the third disclosed embodiment of the invention.

FIG. 9 is a diagram conceptually illustrating a virtual reality training system 3000 according to a third disclosed embodiment of the invention, and FIG. 10 is a perspective view illustrating a floor system 100 and an object member 200 in a virtual reality training system 3000 according to the third disclosed embodiment of the invention. A virtual reality training system 3000 based on the third disclosed embodiment has many features in common with a virtual reality training system 1000, 2000 based on the first and second disclosed embodiments, and some of these common features may have been omitted in the drawings and descriptions.

Referring to FIG. 9, a virtual reality training system 3000 according to the third disclosed embodiment of the invention can include a floor system 100, object members 200, an input unit 300, a mapping unit 400, a control unit 500, and a lighting unit 600. The input unit 300, mapping unit 400, and control unit 500 can be integrated within a single computing device 550.

The object members 200 can be detachably installed onto the floor system 100, and when the input unit 300 assigns the first positions and the mapping unit 400 computes the corresponding second positions, the control unit 500 can control the lighting unit 600 accordingly. Here, the lighting unit 600 can irradiate visible rays from lighting elements 160 provided at the second positions, as in the first disclosed embodiment, or irradiate visible rays toward the second positions from lighting elements 660 provided at different locations.

Referring to FIG. 9, for example, the lighting unit 600 of a virtual reality training system 3000 based on the third disclosed embodiment of the invention can include lighting elements 660 that are configured to irradiate visible rays while mounted on a structure 610 that is installed at a particular height from the base 110 of the floor system 100. In cases where the juncture between an object member 200 and the base 110 is shaped as a straight line as in the first and second disclosed embodiments, the visible rays irradiated by the lighting element 660 onto the second position can also be configured to draw a straight line on the base 110. Of course, if there is a grid drawn on the upper surface of the base 110, the visible rays irradiated by the lighting element 660 may not necessarily draw a straight line.

In certain embodiments, one or more lighting element 660 can be provided at each position available for installing an object member 200 in one-to-one correspondence to be turned on and off while in a fixed state. In this case, each of the lighting elements 660 can be fixed in a designated angle, e.g., in a vertically downward direction.

Conversely, in certain embodiments, at least one of the lighting elements 660 can be movably mounted on the structure 610. In this case, the lighting elements 660 can be provided in a number corresponding to the maximum number of objects 312 permitted in the UI 310 of the input unit 300, and when the mapping unit 400 computes the second positions in a number smaller than or equal to the maximum number, the lighting unit 600 can cause the lighting elements 660 to irradiate visible rays towards the second positions. Reference to a lighting element 660 being movable is intended to encompass not only cases in which the lighting element 660 is moved by a separate drive unit 640 in a translational motion on the structure 610 but also cases in which the lighting element 660 is rotated by an angle to face the particular position. Certain embodiments can use a combination of fixed lighting elements and movably mounted lighting elements.

While the visible rays are being irradiated by the lighting elements 660 onto the second positions, the object members 200 can be manually or automatically installed on the floor system 100.

While the coupling of the object members 200 onto the floor system 100 can involve a method of providing slots 150 in the base 110 of the floor system 100 and forming securing parts 250 on the object members 200 as in the first and second disclosed embodiments, various other coupling structures can be applied to the base 110 and object members 200.

For example, numerous small indentations (not shown) can be formed in the base 110, and multiple pins (not shown) corresponding to the indentations can be formed on the bottoms of the object members 200. Here, the indentations in the base 110 can be formed in a size that does not interfere with a person's walking over the base 110, and the pins on the object members 200 can be formed in a strength, diameter, and length that can secure the object members 200 with a sufficient degree of strength. Such a configuration can provide the advantage that the shapes of the object members 200 can be implemented with a greater degree of freedom, compared to the case of using slots arranged in a particular pattern such as a grid, whereby the object members 200 can be formed in customized shapes. Here, if the lighting unit 600 includes movable lighting elements 660, the visible rays irradiated by the lighting unit 600 can also be emitted in customized shapes. The UI 310 of the input unit 300 can permit the user to place objects 312 that have the same or similar shapes as the shapes of the available object members 200.

FIG. 10 illustrates another structure for coupling object members 200 onto the floor system 100. Referring to FIG. 10, cavity parts 174 configured to be openable and closable can be formed in the upper surface of the base 110 in the floor system 100, while pile parts 274 configured to be inserted into the cavity parts 174 can be formed on the bottom surfaces of the object members 200. The cavity parts 174 can normally be kept closed so as not to interfere with a person's walking over the base 110.

When the mapping unit 400 computes the second positions, the control unit 500 can transmit control signals that cause the lighting unit 600 to mark the second positions with visible rays and, at the same time, cause the floor system 100 to open the cavity parts 174 at the corresponding positions. While the cavity parts 174 are opened at the required positions, the pile parts 274 of the object members 200 can be manually or automatically inserted into the cavity parts 174 of the floor system 100.

In another embodiment not shown in the drawings, the floor system 100 can include a multiple number of protrusion parts (not shown) that are movable along the vertical direction within a range from a height that is level with or below the upper surface of the base 110 to a particular height above the upper surface, while the holding parts (not shown) configured to receive the protrusion parts can be formed in the bottom surfaces of the object members 200. The protrusion parts (not shown) can normally be kept at a height level with or below the upper surface of the base 110 so as not to interfere with a person's walking over the base 110.

When the mapping unit 400 computes the second positions, the control unit 500 can transmit control signals that cause the lighting unit 600 to mark the second positions with visible rays and, at the same time, cause the floor system 100 to move the protrusion parts (not shown) upward at the corresponding positions. While the protrusion parts are protruding from the required positions, the object members 200 can be manually or automatically installed on the floor system 100 such that the protrusion parts are inserted into the holding parts of the object members 200.

The positions where the cavity parts 174 or protrusion parts are formed can substantially correspond to a grid pattern. Such a grid pattern can be marked on the upper surface of the base 110 or can be unmarked. Here, even when the positions of the cavity parts 174 or protrusion parts follow a grid pattern, the object members 200 may not necessarily be installed in an arrangement that follows the grid pattern, and an object member 200 can be installed in any of a variety of positions in any of a variety of angles as long as the pile parts 274 or holding parts of the object member 200 can be coupled with the cavity parts 174 or protrusion parts.

In the coupling structure entailing indentations and pins described above, the sizes of the indentations may be limited in order not to interfere with a person's walking over the base 110, so that the diameters of the pins may also be limited, and consequently the coupling strength of the object member 200 may be limited. In contrast, in a coupling structure based on cavity parts 174 and pile parts 274 or in a coupling structure based on protrusion parts and holding parts, the diameters of the pile parts 274 or protrusion parts need not be limited, so that the required coupling strength may be more easily implemented.

Referring to FIG. 10, an object member 200 can include a coupling protrusion 221 on one end and a coupling groove 222 in the other end. The coupling protrusion 221 and coupling groove 222 can be used to connect adjacent object members 200 to each other when they are installed. In cases where floor units 120 having slots 150 formed therein are installed in the base 110 as in the first and second disclosed embodiments, a gap may be formed between two adjacent floor units 120 extending along the same direction (i.e., where the cross-shaped slot mentioned above may be provided), as a result of which a gap may be formed between the object members 200 installed on the two adjacent floor units 120. In contrast, in cases where no floor units 120 are used, as in the third disclosed embodiment of the invention, there may be no gap formed between adjacent object members 200, and it is possible to connect the adjacent object members 200 by way of a simple method using coupling protrusions 221 and coupling grooves 222. The coupling parts on both ends of the object member 200 can be formed differently in consideration of various cases where multiple object members 200 adjoin one another in different angles.

With the third disclosed embodiment of the invention presented above, the user can place one or more objects 312 in a virtual reality space 311, and the virtual reality training system 3000 can show the corresponding positions also on the floor system 100 to specify the positions where object members 200 should be installed. A virtual reality training system 3000 based on the third disclosed embodiment of the invention can enable the placement of objects 312 with a higher degree of freedom without interfering with a person's walking over the base 110. Thus, the virtual reality training system 3000 based on the third disclosed embodiment of the invention makes it possible to organize a training space with a significantly higher degree of freedom, thereby greatly increasing the possible range of training modes.

While the foregoing provides a description with reference to certain embodiments of the present invention, it should be appreciated that a person having ordinary skill in the relevant field of art would be able to make various modifications and alterations to the present invention without departing from the spirit and scope of the present invention set forth in the scope of claims below.

What is claimed is:

1. A virtual reality training system comprising:
- a floor system including a base of a particular length and width;
- an object member configured to be detachably installed on the floor system;
- a lighting unit comprising a lighting element configured to irradiate visible rays towards the second position or from the second position;
- one or more processors coupled with a non-transitory memory storing instructions that, when executed, cause the one or more processors to:
  - assign a first position corresponding to a position of an object within a virtual reality space, the virtual reality space having a length and width smaller than or equal to the length and width of the base of the floor system;
  - compute a second position for installing the object member on the floor system, the second position computed as a position on the floor system corresponding to the first position within the virtual reality space;
  - generate a control signal based on the computed second position;
  - transmit the control signal to the floor system, wherein, in response to receiving the control signal, the floor system performs at least one of: (i) causing a lighting element corresponding to the second position to emit visible rays; (ii) actuating a drive unit disposed within a slot to move the object member along the slot to the second position; (iii) actuating a protrusion part at the second position to move upward; or (iv) actuating a cavity part at the second position to open or close; and
- a loading device arranged adjacent to an edge of the floor system, wherein, when the first position is assigned, the one or more processors are configured to compute the second position and provide the control signal to actuate the floor system at the computed second position, wherein the floor system further comprises a plurality of protrusion parts or a plurality of cavity parts, the protrusion part configured to be movable along a vertical direction within a range defined between a height below an upper surface of the base and a particular height above the upper surface of the base, the cavity part formed in the upper surface of the base and configured to be opened and closed, the object member comprises a holding part or a pile part, the holding part configured to receive the protrusion part inserted therein, the pile part configured to be inserted into the cavity part, and the floor system moves the protrusion part upward or opens the cavity part at the second position according to a received control signal, wherein the floor system comprises a plurality of slots formed in the base, and the object member comprises a securing part configured to be inserted into the slot such that the object member installed on the floor system is capable of movement along the slot, wherein the floor system further comprises a drive unit provided within the slot, the drive unit configured to move the object member along the slot, wherein the plurality of slots are open through a side surface at the edge of the floor system, and the loading device is configured to insert the securing part of the object member through an open side of a slot corresponding to the second position from among the plurality of slots, wherein, in response to the control signal, the lighting element irradiates the visible rays indicating the second position, the drive unit moves the object member along the slot to the second position, and the floor system moves the protrusion part upward and/or opens the cavity part at the second position.

2. The virtual reality training system of claim 1, wherein the lighting element is installed at a particular height from the base and configured to irradiate visible rays towards the second position.

3. The virtual reality training system of claim 2, wherein at least one lighting element is movably mounted on a structure installed at a particular height from the base and is configured to irradiate the visible rays after moving to a position permitting the irradiating of the visible rays towards the second position.

4. The virtual reality training system of claim 1, wherein the lighting unit comprises lighting elements mounted within the plurality of slots, and the lighting unit irradiates the visible rays from a lighting element corresponding to the second position.

5. The virtual reality training system of claim 1, wherein the object members include a plurality of types, the plurality of types differing from one another in at least one of size, shape, texture, and scent, the one or more processors coupled with the non-transitory memory storing instructions that, when executed, cause the one or more processors to:

assign a type of the object together with the first position; and compute the type of the object member together with the second position, and the lighting unit alters a color of the visible rays depending on the type of the object member.

6. The virtual reality training system of claim 1, wherein the floor system further comprises sensors provided within the plurality of slots respectively, the sensor configured to detect whether or not the object member is installed in the corresponding slot.

7. The virtual reality training system of claim 6, wherein the object member comprises a tag part, and the sensor identifies at least one of a type, size, ID number, and assigned position of the object member from the tag part.

8. The virtual reality training system of claim 1, wherein the object member comprises a coupling part on an edge portion at both sides such that the coupling parts are capable of at least partially bridging a gap between adjacent object members.

9. The virtual reality training system of claim 1, wherein the one or more processors coupled with a non-transitory memory storing instructions that, when executed, cause the one or more processors to provide a UI and assigns the first position according to an input by a user, the UI expressing the virtual reality space 2-dimensionally or 3-dimensionally.

10. The virtual reality training system of claim 9, wherein the UI is provided via a VR headset worn by the user.

11. A floor unit for a floor system of a virtual reality training system, the floor unit comprising:

a body extending in one direction in a length corresponding to a grid unit of the floor system;

a slot formed in the body that is open at an upper surface and at both ends of the body, the slot having an upper portion narrower than a lower portion; and a lighting element installed within the slot, wherein the lighting element is configured to emit rays through the open upper surface of the slot to indicate a position in the grid unit where the object member is to be installed; and a sensor configured to detect an object member inserted in the slot, wherein the sensor is installed in the lower portion of the slot and detects the rays within the slot, wherein the sensor is configured to detect rays irradiated by the lighting element, the object member blocks the rays of the lighting element from arriving at the sensor when the object member is inserted in the slot, and the sensor detects a presence of the object member based on a reduction in an amount of detected rays.

12. The floor unit of claim 11, further comprising a roller rotatably installed within the slot, the roller configured to support an object member inserted in the slot, wherein the roller supports a securing part of the object member while the securing part remains inserted in the slot.

13. The floor unit of claim 11, further comprising a drive unit provided within the slot, the drive unit configured to move an object member inserted in the slot by applying a driving force directly to the object member while the object member remains inserted in the slot.

* * * * *